Mar. 27, 1923.

H. B. WALTER 1,449,641

MULTIPLE STAPLING MACHINE

Filed Aug. 30, 1919

INVENTOR
Harrison B. Walter.

WITNESS
F.J.Hartman

BY
Blount Moulton,

ATTORNEYS

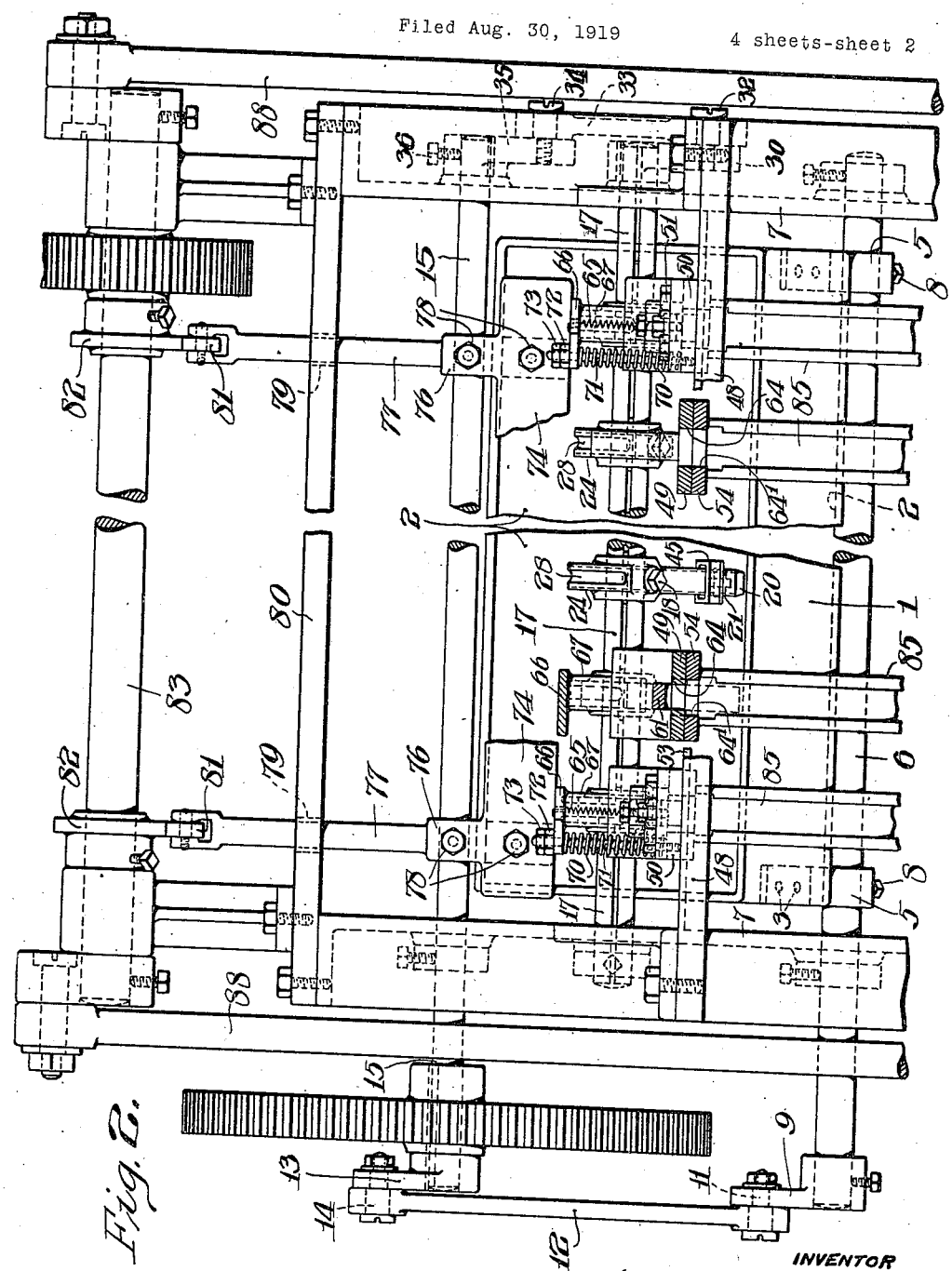

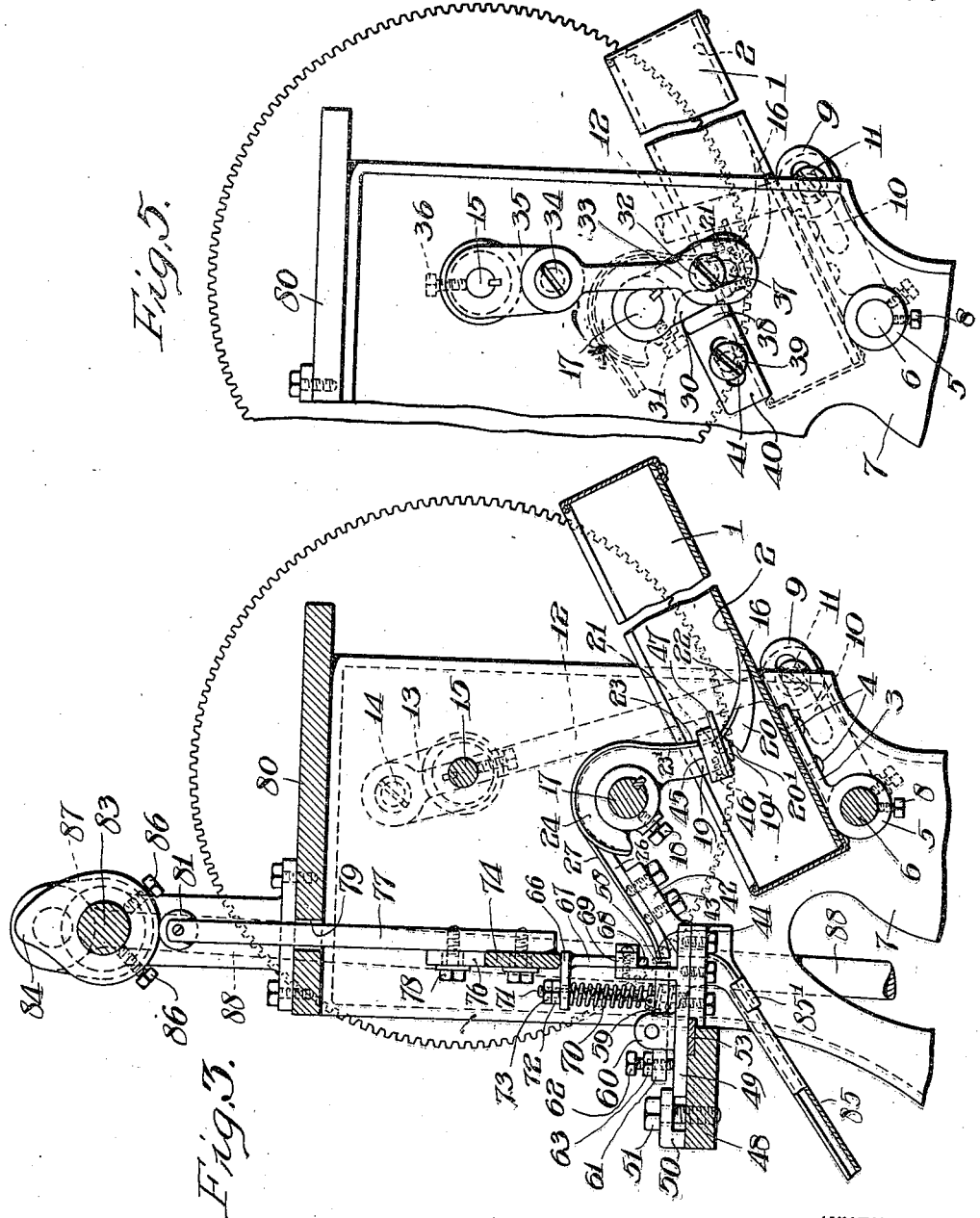

Mar. 27, 1923.

H. B. WALTER 1,449,641

MULTIPLE STAPLING MACHINE

Filed Aug. 30, 1919   4 sheets-sheet 4

INVENTOR
Harrison B. Walter.

WITNESS
F. J. Hartman.

BY

ATTORNEYS

Patented Mar. 27, 1923.

1,449,641

UNITED STATES PATENT OFFICE.

HARRISON B. WALTER, OF PHILADELPHIA, PENNSYLVANIA, ASSIGNOR TO FIBRE CONTAINER COMPANY, A CORPORATION OF PENNSYLVANIA.

MULTIPLE-STAPLING MACHINE.

Application filed August 30, 1919. Serial No. 320,897.

*To all whom it may concern:*

Be it known that I, HARRISON B. WALTER, a citizen of the United States, and a resident of the city of Philadelphia, county of Philadelphia, State of Pennsylvania, have invented certain new and useful Improvements in Multiple-Stapling Machines, of which the following is a specification, reference being had to the accompanying drawing, forming a part thereof.

The invention relates to a stapling machine of the multiple type wherein any number of a plurality of staples may be simultaneously driven through and clinched about the parts to be secured together by such staples.

The invention, however, relates more particularly to the staple separating mechanism in connection with the feeding device, of which the former is in the form of a reciprocating hopper or pan combined with a reciprocating separator, and the latter receives staples from said separating means in a certain order and feeds, as required, a plurality of said staples simultaneously to the respective points where the driving and clinching are performed. The invention relates to a machine of the type shown and described in my copending application, Serial No. 290,155, filed April 15, 1919.

As in said copending application, one of the objects of the invention is to provide a machine that is adapted to use previously made staples with automatic means to separate and feed the same in multiple to the driving and clinching devices.

Another object is to construct a machine with a novel and useful common means for containing, and controlling the position of, all of the made staples and from which means the staples for the several driving means may be separated and fed as required.

Another object is to provide a machine with a novel and useful means for separating and properly positioning the separated staples in predetermined order to be successively operated upon by the feeding means.

Another object is to provide a machine of the character above mentioned with a new and useful simple means for efficiently and efficaciously separating a number of staples from a conglomerate mass of staples and to guide the same in a defined order to the feeding means.

Such other useful and advantageous objects of my invention will be disclosed by the following specification and illustrated in the accompanying drawing.

As aforesaid, the present invention relates to a machine for driving made staples in multiple rather than for successively driving staples made from a piece of wire strip of indefinite length from which staple pieces must first be cut and then shaped into the form of staples prior to their stapling function. The advantages of using made staples for the purposes mentioned are clearly set forth in my aforesaid copending application.

A practical embodiment of my invention is illustrated in the accompanying drawing, in which:

Fig. 2 is a vertical front view in elevation of the same with parts shown in section;

Fig. 3 is a vertical transverse sectional view of the same with the parts in one position of operation;

Fig. 5 is a side view in elevation of a detail of the means for the separating and transferring device, and, Fig. 6 is a similar view of the same showing the parts in another position of operation.

Figure 1:
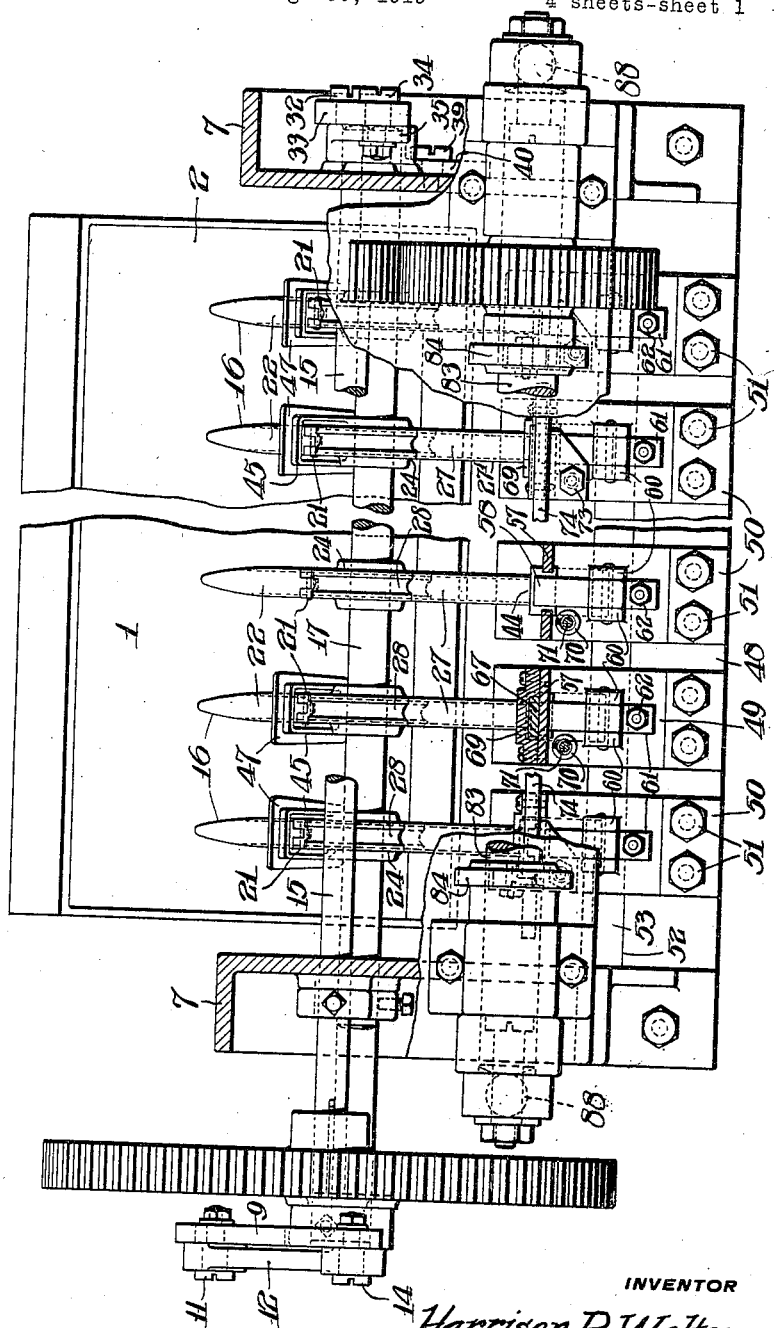
Fig. 1 is a top plan view of the device.
Figure 6:
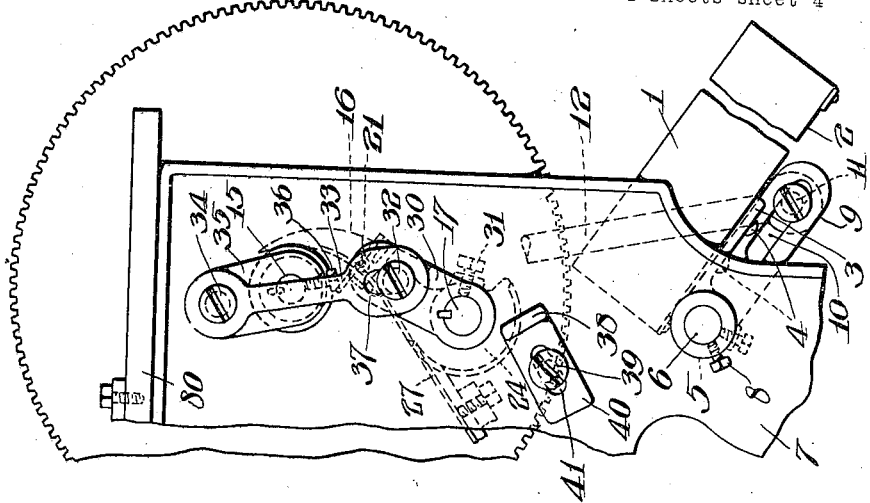

Referring now more particularly to the drawing in which similar reference characters are used to designate the corresponding parts in the several views, I have shown in a multiple stapling machine of the type referred to above, generally, a reciprocating hopper or pan for containing a mass of made staples, a reciprocating separating means in the form of a hook operating in conjunction with said reciprocating hopper for receiving, transferring and guiding the separated staples or fastening elements from the hopper or pan to the feeding devices and feeding devices for receiving said staples from said separating means and for simultaneously feeding the staples to a plurality of raceways or chutes wherein the staples simultaneously move by gravity to several driving and clinching means, which may be, of any suitable type, or that referred to and disclosed in my copending application hereinbefore mentioned.

The staple storing and containing means comprises a hopper or pan 1 of preferably rectangular form to the bottom 2 of which may be suitably secured a hinge strap 3 by any suitable securing means such as screws or rivets 4. The strap is provided with a bearing sleeve or hub 5 adapted to be adjustably attached to the shaft 6 transversely disposed in the machine and supported in the side walls 7 thereof. These straps 3 may be suitably secured to the shaft 6, to angularly reciprocate therewith, by means of set screws 8.

To an end of the shaft 6, which projects beyond one of the side walls 7, preferably at the left side of the machine as viewed in Fig. 2 of the drawing, is suitably keyed a crank arm 9 to angularly turn or reciprocate therewith. The crank arm 9 is provided near its free end with an elongated slot 10 in which is adapted to be adjustably secured a pivot stud 11. To this stud may be pivotally connected, at an end thereof, the link 12, the other end of the link being suitably pivotally connected to the free end of the crank 13 by means of the pivot stud 14, the crank being keyed to the rotating shaft 15 for rotation therewith.

The separating means comprises a plurality of separating elements, or hooks 16 mounted upon a transverse shaft 17 in predetermined adjusted spaced relation and adapted to angularly vibrate or oscillate therewith. The shaft 17 extends transversely through the machine, between the side walls 7, and is supported in suitable bearings provided in said side walls. The separating elements are secured to the shaft in any suitable manner, as by means of set screws 18. Each separating element comprises a shank member 19 and a tapered spur member 20 pivotally connected together by the pivot and tongue connection 21 whereby the tapered spur 20 is adapted to have a certain amount of relative angular movement to the shank member 19. In certain positions, where the shoulders 20′ and 19′ of the spur 20 and the shank 19 respectively are in contact, the relatively movable parts coact and act as a single rigid member. The spur member 20 is suitably curved and tapered to provide a curved surface 22 on the top portion thereof which aligns with the curved surface 23 of the shank member and is also tapered at the sides thereof for facilitating the engagement of the fastening elements or staples therewith. The shank member is provided with a circular hanger portion 24 at the periphery of which is located the end 25 of a bridge member 26, such end 25 being cut into an arcuate form to closely fit against said periphery at all times during the angular reciprocation of the shank member about the axis of the shaft 17, whereby the surfaces 22 and 23 form a continuous smooth path with the surface 27 of the bridge member. The periphery of the circular portion 24 may be also provided with a groove 28 in which may slide a tongue or guide member 29 provided on the lower surface of the arcuate end 25 of the bridge member.

At one end of the shaft 17, preferably at the right side of the machine as viewed in Fig. 2, is provided a crank 30 which may be secured thereto, to rotate therewith, by means of set screws 31. The free end of the crank arm 30 is provided with a pivot stud 32 to which may be pivotally connected the lower end of the link 33, the other end of said link being connected to a pivot stud 34 on a crank 35 which may be fixed to the continuously rotating shaft 15, as by set screws 36. The lower end of the link 33 is provided with an elongated slot 37 whereby a certain amount of relatively free or idle movement may be obtained between the link 33 and the pivot stud 32. Adjacent to the crank arm 30, when in its lowermost position, is suitably attached to one of the side walls 7 of the machine an abutment stop 38 by any suitable attaching means such as screw 39. The flange 40 of this abutment member may be provided with an elongated slot 41 by which the abutment may be adjustably secured to any desired position relative to the crank arm 30. The abutment stop is positioned so that as the crank arm 30 reaches its lowermost position the same will suddenly contact with said stop and produce a jarring effect upon the separating elements in order to loosen or disentangle any fastening elements or staples that might possibly become entangled or jammed thereupon, the link being adapted, by reason of the slot 37 provided therein, to move idly relative to the pivot stud 32 upon any further movement thereof by the continued rotation of the crank 35.

Each bridge member 26 may be suitably secured in an inclined position, greater than the angle of repose, to a supporting bracket 42 by means of screws 43, with the lower end 44 of the bridge curving into a horizontal position adjacent to the picking-off plunger of each feeding means. This provides for a simple and efficient means for conveying the fastening elements or staples from the separating means to the feeding devices. Each of the separating elements including the spur and the shank, as well as the bridge member, are of a width equal to slightly less than the distance between the legs of a staple and with the sides thereof substantially parallel whereby the legs of a staple lie pendant adjacent thereto as the straddling staples slide down the inclined curved surfaces 22 and 23 and the surface 27 of the bridge. The top surfaces of the separators, the hanger, and bridge including the curved surfaces last mentioned, are all provided at the lateral edges thereof with the enlarged portions or bead like formation 22', 23' and 27' which overhang the lateral faces of the separator, the hanger and the bridge, thereby providing for a minimum amount of friction between the parts mentioned and the legs of the staples, the latter, when moving near such parts having the legs thereof suitably spaced from the side faces of said parts.

Each separating device may be provided with a trap member or guard 45 substantially of the form of a rectangular frame with its top and lateral sides spaced from the top and side surfaces of the separator shank a distance slightly greater than the thickness of the heads and legs of staples whereby the latter may freely pass in single succession through this guard over and along said shank. The guards may be rigidly secured to the under side of the shanks 19 by any suitable means, as by screws 46. Each guard is of utility for preventing entangled or imperfectly formed staples from passing along the separating members 16, and interfering with the free passage of the properly formed staples. The forward ends of the trap member also may be provided with the guard plates 47 for the purpose of further assuring the holding back of superfluous or irregular staples, which might otherwise find their way to the shanks 19.

From the above it may be seen that as the hopper is caused to incline in one direction or another that the staples placed therein will slide from one end of the hopper to the other whereupon certain of said staples will be adapted to engage with the several separators upon the spurs 20 thereof, with the legs of the staples depending on both sides of the separators as the heads of the staples slide over the top surfaces of the spur and shank portions of the separators. The spurs are also tapered at the sides thereof whereby the same may act to laterally urge the staples which may not be squarely presented to the ends thereof, into the positions where the staples may properly engage with the separators. This provides for a very efficient and efficacious means therefor.

Transversely between the side walls 7 of the frame of the machine is supported at a suitable height a carrier 48 upon which are mounted the staple feeding devices. Each of the latter comprises a base plate 49 supported upon the carrier in predetermined adjusted spaced relation to the other base plates and secured in stationary position to said carrier by the L-shaped clamping members 50 and the clamping bolts or screws 51. The carrier may be provided longitudinally thereof with a groove 52 in which may be located a guide track 53 with which the base plates 49 are adapted to slidably cooperate, to be guided thereby when a relative adjustment of said plates is being made. Each base plate 49 has provided at the under side thereof supporting bracket bases 54 which may be secured thereto by means of screws 55, or the like. Each base 54 may be provided with a flange 56 adapted to underhang the track 53 for maintaining the same and the attached base plates 49 in proper guiding engagement with such track. The bracket bases 54 and the supporting brackets 42 are integrally formed for the purpose of rigidly supporting the bridge members, the brackets extending upwardly through a portion of the opening or slot 64 provided in each base plate 49.

Each of the base plates 49 is also provided with an upwardly extending stop member 57 of the shape of an inverted U. These stop members are located opposite the ends 25 of the bridge members 26 and are also spaced therefrom a distance slightly greater than the width of a head of a staple. In the opening provided between the legs of the stop member projects the end 58 of a trip lever 59, such end extending towards the lower end of the bridge member. Each of said trip levers is supported in a pivot bracket 60 integrally formed with the base plate 49 and projecting upwardly therefrom. Each of the trip levers may be provided with a rearwardly extending arm 61 through which may be threaded an abutment screw 62, the lower end of said screw being adapted to contact with the top surface of the base plate 49. Each abutment screw may be locked in an adjusted position by the lock nut 63. The end 58 of the trip lever lies adjacent to the lower end of the bridge 26 with the upper surfaces of said trip lever and said bridge end lying in the same plane and with the widths of said trip lever and said bridge member equal to the width of the separating members, that is to say, slightly less than the distance between the legs of a staple. The top surfaces of the hanger and the bridge, over which the staples travel, are similar to those of the separating members and are also provided with the lateral overhanging portions or enlargements as in the case of the separators.

From the above it may be seen that the staples may slide successively along the separating members, the hangers, the bridge members and over the end of the latter onto the end 58 of the trip lever with the leading staple of each line of staples abutting against the stop member 57 and remaining in that position with the legs of the staples pendant on each side of the trip lever, until the staples are forced downwardly through the openings 64 and 64' provided in the base plates and the bracket bases respectively beneath the end 58 of the trip lever. The end 58 of each trip lever projects beyond the stop member 45 merely the distance substantially equal to the width of the head of a staple so that only one staple may be supported upon the end of each trip lever at a time. Each trip lever may be maintained in its staple receiving and supporting or uppermost position by means of a spring 65 connected at an end thereof to said trip lever and at the other end thereof to a cross head 66 located at a suitably spaced distance above the trip lever. Each cross head overhangs the end of the trip lever, as well as the lower end of the bridge member, and is provided with a downwardly extending picking-off plunger 67 of a thickness substantially equal to the width of a staple head and of a width substantially equal to the length of such staple head. The lower end 68 of the plunger 67 is adapted in the downward movement thereof, to engage with a staple head and to force the same downwardly into the openings 64 and 64'. Each plunger in its movement is guided through a guide strap 69 suitably secured to the upper end of the stop member 57 as by screws or similar attaching means.

Each of the feed plungers is normally held upward by a coiled compression spring 70 interposed between and expansibly reactive against the cross head 66 and the base plate 49. Each cross head is provided with an aperture through which projects a guide rod 71 rigidly fixed at its lower end to the base plate 49, such guide rod acting as a guiding means for the vertical reciprocation of the cross head 66 and the plunger 67. The upper end of said guide rod is provided with an abutment nut 72 and a lock nut 73, which may adjustably limit the upward movement of the cross head and the feed plunger. The coiled spring may be located, if desired, to surround and be guided by said guide rod 71.

Transversely of the machine extends a horizontal feed bar 74 which normally rests upon all of the cross heads 66 and which is adapted, in the downward movement thereof to force said cross heads and plungers also downwardly. The bar may be also provided with vertically extending portions 76 to which may be rigidly secured, as by screws 78, the vertically reciprocable cam rods 77. The cam rods extend upwardly through and are guided by the openings 79 provided in the top plate 80 of the machine and may be provided at the upper ends thereof with cam rollers 81 adapted to engage with the cam surfaces of the cams 82 mounted upon the shaft 83. Reciprocation of the feed bar is obtained by means of the cams 82 as the same are rotated with the shafts 83 and the raised portions or swells 84 of the cams 82 are brought into engagement with the cam rollers 81 to downwardly move the cam rods 77 and the feed bar 74. This effects a downward movement of the cross heads 66 and the plungers 67, the lower end of the latter engaging with the heads of the staples previously located upon the ends of the trip levers, to force the same downwardly through the openings 64 and 64' into the raceways or chutes 85. The cams 82 may be secured to the shaft 83 by any suitable means, as by set screws 86.

At the ends of the shaft 83 may be provided thrust cranks 87 suitably keyed thereto for rotation therewith. To the free ends of these cranks may be pivotally connected the upper ends of the thrust rods 88, with the lower ends thereof connected to a driving and clinching means, of any suitable type, as are disclosed in my copending application hereinbefore referred to. It may be observed, therefore, from the above, that the rotation of the shaft 83 will operate the staple feeding mechanism simultaneously with or in predetermined relation with the operation of the driving and clinching means, for feeding staples thereto in proper time relation.

Beneath each base plate 49 and the bracket base 54 is secured, in any suitable manner as by screws 55', a raceway bracket 85' in which is supported the upper open end of an inclined raceway or chute 85 in register with the openings 64 and 64' provided in said base plate 49 and bracket base 54 respectively, and with the lower end thereof connected to the above mentioned driving and clinching means.

The machine may be provided with power means driven from a motor suitably supported upon the machine frame in any appropriate position and suitably geared to the parts above described in the manner hereinbefore also fully described in my above mentioned copending application.

In operating the device, made staples of the size chosen are placed within the hopper and the hopper is caused to reciprocate angularly about the axis of the shaft 6 from the continual rotation of the shaft 15 and the parts connected therebetween to the hopper so as to incline the bottom surface of the hopper at opposite angles in such a manner that the staples may be caused to move backwardly and forwardly over said surface as the hopper is reciprocated. This causes a conglomerate mass of staples to periodically move toward the angularly reciprocated separating hooks, which are also continually operating, by which certain staples may be separated and transferred from the hopper to a position where the staples may be fed to and over the bridge members. During the movement of the hopper a certain number of the staples will engage with the spurs of the separating hooks which are reposing freely upon the lower surface of the pan or hopper in such a way that the heads of the staples will ride over the surfaces 22 and 23 of the separating hooks and with the legs of the staples depending on each side of the hooks adjacent the lateral faces thereof. The trap members or guards are secured to the separating hooks and permit the staples to slide therethrough in single succession over each separator and prevent any entangled, imperfect or deformed staples from passing therethrough.

Figure 4:
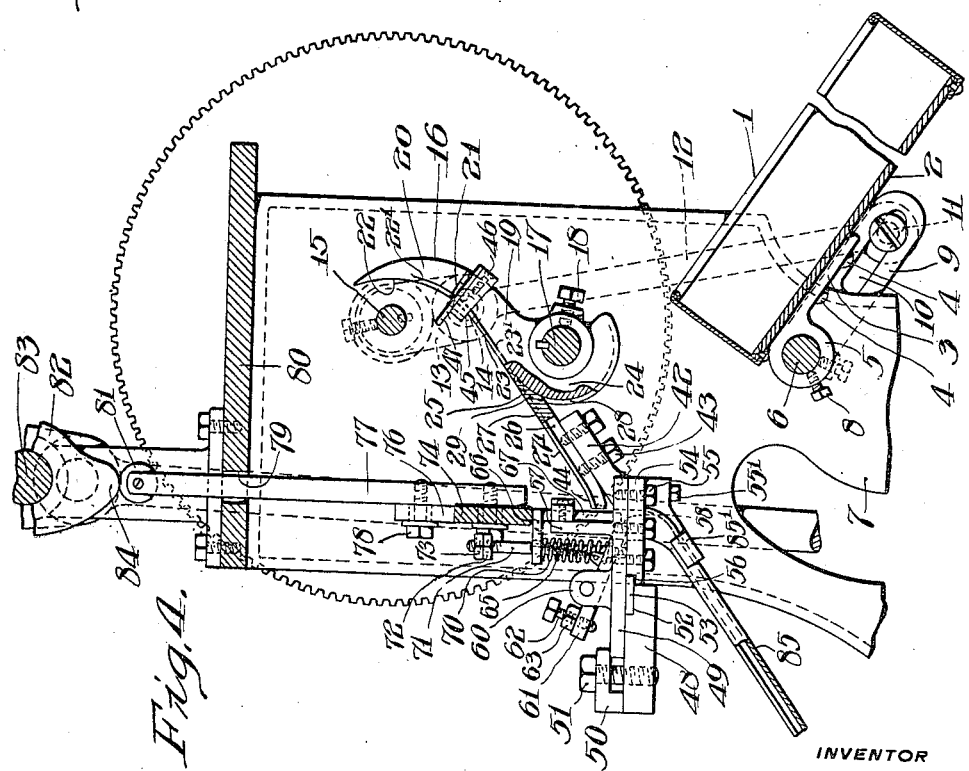
Fig. 4 is a similar view with the parts in another position of operation.

The continual rotation of the shaft 15 through the crank 35, link 33 and arm 30, as clearly shown in Fig. 4, imparts a periodic angular reciprocation to the separating hooks in a certain time relation with the reciprocation of the hopper so that as the hopper is inclined to its uppermost position the separating hooks are moved downwardly into the pan or hopper with the spurs thereof coming in contact with the bottom of the pan and resting thereupon, irrespective of further movement of the shanks thereof, as permitted by the pivotal connection 21, thereby preventing any injury to the hopper from the contact of the hooks therewith or by reason of any jamming tendencies thereof against any loose staples that might be left upon the bottom of the hopper in the path of the hooks. Moreover, the spurs assume a position upon the bottom of the pan so as to more effectively receive the staples as the same are caused to slide downwardly in the pan or hopper. It will be noted also that as the crank arm 30 reaches its lowermost position it will be brought suddenly into contact with the stop member 38 thereby imparting to the hooks a jarring effect to loosen therefrom any staples that may be entangled thereupon or irregularly positioned, which might interfere with the proper subsequent operation of the hooks. Upon further rotation of the shaft and the connected parts leading to the separating hooks, the latter are caused to move upwardly, and at the same time the hopper is caused to move downwardly, and the separating hooks are brought into an elevated position whereby any staples raised therewith will slide downwardly over the surfaces 22 and 23 of the hooks and hangers onto the bridge members 26, thence over the lower end 25 of the bridge members and finally onto the ends 58 of the trip levers 59 at which points the same are later picked-off by the picking-off plungers 67. The inclination of the separating members, when in the uppermost position, and the bridge members are such that with the lines of staples arranged thereon the weight of the same is sufficient to force the leading staples from the separating members over the bridge members to the trip levers and to also maintain such leading staples on said trip levers until picked-off by the feed plungers.

At the time when it is desired to drive staples or to feed staples to the driving and clinching mechanism, any suitable means, such as is disclosed by my aforesaid co-pending application, may be manually controlled to operate the thrust shaft 83, to which are connected the thrust rods 88 and the feed cams 82. As the feed cams 82 are caused to rotate the cam portions or swells 84 engage with the cam rollers 81 to cause a downward movement of the cam rods 77 and the feed bar 74 which in turn contacts with and simultaneously moves the cross heads 66 and the plungers 67. The lower ends of the feed plungers therefore contact with the top surfaces of the heads of the staples hanging on the end of the trip lever to force said staples, as well as the end of said strip levers, downwardly from the position shown in Fig. 3 to that shown in Fig. 4. As the trip levers swing about their respective pivots a position will be reached whereby the end of the trip levers will no longer be in exact vertical alignment with the feed plungers but will swing to one side thereof and will permit the staples to slip off of the ends of said levers into the receiving end of the inclined raceways or chutes 85. The raceways are inclined at an angle so that the staples will slide downwardly with the points thereof foremost. Further rotation of the shaft 15 will cause the cam portions or swells 84 to recede from the cam rollers 81 whereupon the coil springs 70, which have been placed under compression during the downward movement of the cross heads, will expand and raise said cross heads and feed plungers, as well as the feed bar and the cam rods to their initial normal position. At the same time as the cross heads are raised by said spring, the same will produce a tension in the springs 65 to thereby raise the trip levers 59 back into position where the top surfaces thereof shall align with the top surfaces of the lower end of the bridge members. Such position of the trip members may be regulated and controlled by the abutment screws 62 provided in the rear end of each trip lever.

The separating members, the guiding members, including the hangers and the bridges, and the feeding devices are adjustable relative to each other for spacing the several separating, guiding and feeding devices the proper distances apart so that the staples will be driven and clinched in predetermined position. Such parts are then secured into adjusted position by the set screws 18 for the hooks 16 and hangers 24 and the clamp members 50 and screws 51 for the bridge 26 and the feeding devices.

Having thus described one embodiment of my invention, it is to be understood, however, that such invention is not to be limited to the particular details herein described or shown upon the drawing, but that the same comprehends other forms or devices adapted to carry out the results herein disclosed without departing from the spirit of my invention and the scope of the appended claims.

Having thus described my invention, what I claim as new, and desire to secure by Letters Patent is:

1. In a stapling machine comprising means for driving and clinching staples, the combination of reciprocable means for holding a quantity of staples, means actuated by power for reciprocating said holding means and for agitating said staples, power driven reciprocable means for separating, transferring and positioning said staples to be operated upon by feeding means, feeding means comprising trip devices adapted to receive said staples and upon which said staples are positioned, power actuated feeding devices for picking-off said staples in a single multiple from said trip devices, and guide means for guiding said staples to said driving and clinching means.

2. In a stapling machine comprising a feeding, driving and clinching means, the combination of staple holding and separating means comprising an angularly reciprocable hopper for holding said staples and for causing the movement of said staples toward and from said separating means, a plurality of angularly reciprocable separating means adapted to move into and out of said reciprocable hopper whereby staples may be received thereupon and carried to a position to cause said staples to slide thereover towards said feeding means, a bridge member connecting said separating means and said feeding means, said feeding means located adjacent the lower end of said bridge members and comprising trip members located relative to said bridge members to receive staples therefrom, said separating means provided with a trap device for preventing the passage of entangled and deformed staples, a power actuated means for picking-off the staples positioned upon said trip members for feeding the same to a raceway and a raceway leading from said feeding means to said driving and clinching means.

3. In a device for feeding fastening elements, the combination of an angularly reciprocable receptacle, an angularly reciprocable separating member adapted to move into and out of said receptacle during the reciprocation of the latter, said separating member being provided with an arc shaped portion, a bridge member located in fixed position and provided at the end thereof with a tapered portion co-acting with the arc-shaped portion of said separating member to provide a smooth and continuous path for the movement of the staples from said separating member to said bridge member, said bridge member being provided with a curved end for directing the staples passing thereover horizontally to the end of trip levers, trip levers located adjacent the lower ends of said bridge members and power actuated feed means for picking-off the staples on said trip lever in order to feed the same.

4. A separating device, for use in a machine for driving and clinching fastening elements, comprising a tapered member, a shank member, a pivotal connection therebetween, and a guard member connected to said shank member.

5. A separating device for fastener inserting machines, comprising a pivotally mounted angularly reciprocable shank member, a curved tapered member pivoted to the end of said shank member and abutment shoulders on the ends of said tapered member and the shank member to limit the pivotal movement of the tapered member relative to the shank member in one direction.

6. In a stapling machine provided with driving and clinching means, the combination of angularly reciprocable means for holding and agitating a quantity of staples, means cooperating with and movable relatively to said staple holding means for separating and transferring staples therefrom and means for receiving said staples from said separating and transferring means and means for feeding the same to said driving and clinching means.

7. In a stapling machine provided with driving and clinching means, the combination of angularly reciprocable means for holding and agitating a quantity of staples, means cooperating with and movable relatively to said holding means for separating and transferring staples from said holding means, means for guiding and positioning said transferred staples and means for feeding said positioned staples in single multiple to said driving and clinching means.

In witness whereof, I hereunto set my hand this 2d day of August, 1919.

HARRISON B. WALTER.